United States Patent
Longtin

(10) Patent No.: US 6,574,948 B2
(45) Date of Patent: Jun. 10, 2003

(54) ILLUMINATIVE SAFETY GARMENTS FOR WORKING ANIMAL

(76) Inventor: Deborah L. Longtin, 1397 Cedar Grove Rd., Feura Bush, NY (US) 12067

( * ) Notice: Subject to any disclaimer, the term of this patent is extended or adjusted under 35 U.S.C. 154(b) by 0 days.

(21) Appl. No.: 10/223,737

(22) Filed: Aug. 20, 2002

(65) Prior Publication Data

US 2003/0061790 A1 Apr. 3, 2003

Related U.S. Application Data

(63) Continuation-in-part of application No. 09/967,687, filed on Oct. 1, 2001, now abandoned.

(51) Int. Cl.[7] .............................. B68C 5/00; A42B 1/18
(52) U.S. Cl. ......................... 54/79.2; 54/80.4; D30/145
(58) Field of Search ..................... 119/850; 54/79.1, 54/79.2, 79.4, 80.4; 2/94; D30/145

(56) References Cited

U.S. PATENT DOCUMENTS

| | | | | |
|---|---|---|---|---|
| 215,983 A | * | 5/1879 | Simpson | 54/79.2 |
| 243,040 A | * | 6/1881 | Hand | 54/80.4 |
| 373,764 A | * | 11/1887 | Ayres | 54/79.1 |
| 791,372 A | * | 5/1905 | Seaders | 54/79.2 |
| 4,214,421 A | * | 7/1980 | Battle et al. | 54/79.2 |
| 5,271,211 A | * | 12/1993 | Newman | 54/79.2 |
| 5,361,563 A | * | 11/1994 | Llamas | 54/79.2 |
| D372,563 S | * | 8/1996 | Waugh, Jr. | D30/145 |
| D374,315 S | * | 10/1996 | Caditz | D30/145 |
| 5,996,537 A | * | 12/1999 | Caditz | 119/850 |
| 6,003,290 A | * | 12/1999 | Hsi-Chang | 54/79.1 |
| D418,635 S | * | 1/2000 | Stevens | D30/145 |
| 6,009,693 A | * | 1/2000 | Hsi-Chang | 54/79.1 |
| 6,089,194 A | * | 7/2000 | LaBelle | 119/850 |
| 6,128,891 A | * | 10/2000 | McMahon | 54/80.1 |
| 6,345,393 B1 | * | 2/2002 | Bayer | 2/94 |

* cited by examiner

Primary Examiner—Charles T. Jordan
Assistant Examiner—Elizabeth Shaw
(74) Attorney, Agent, or Firm—Fredric Morelle

(57) ABSTRACT

Lightweight, insect-barrier garments of reflective/illuminative, moisture-wicking or otherwise breathable covering for protection of a working animal. An ensemble of from one to three garment sections is provided to cover portions of the animal's body that are susceptible to harassment by biting or stinging insects. Illuminative character is present in the invention in modes and at locations that attain the highest profile of visibility, in respect of ambient visibility and the task to which the animal is placed, e.g. daylight/dusk and under saddle, hunting, etc. A bonnet section of the ensemble, integrable with the neck section, is fashioned to stand away from the animal's eyes, thereby protecting its sight by providing a protective insect-resistive guard or debris barrier.

19 Claims, 6 Drawing Sheets

ILLUMINATIVE SAFETY GARMENTS FOR WORKING ANIMAL

CROSS-REFERENCES TO RELATED APPLICATIONS

This is a Continuation-in Part of application Ser. No. 09/967,687 filed by the same inventor on Oct. 1, 2001 and entitled: High Visibility Fly Gear now abandoned.

STATEMENT REGARDING FEDERALLY SPONSORED RESEARCH OR DEVELOPMENT

Not Applicable

BACKGROUND OF THE INVENTION

1. Field of the Invention

This invention pertains, generally, to very lightweight safety and protective garments for working animals. The garments provide comfortable protection to such animals against insect (primarily biting flies) harassment as well as possessing high visibility and identifying indicia on any individual garment. Specifically, the invention provides an ensemble, consisting in an assemblage of garments that are constructed so as to cover, or drape, discrete portions of a working animal's body and which (independently) provide protection against biting insects, while presenting, for use during times of low or obscured visibility, superficial illuminative indicia for identification.

2. Discussion of Relevant Art

Several documents have been found that disclose various attempts to provide animal clothing, or garments, that would afford the general characteristics stated above, namely safety and fly-resistive protection. The most relevant of these documents have, as they appear to the instant inventor, both advantages and limitations as hereinafter discussed.

In U.S. Des. Pat. No. 418,635 ('635), titled RIDING BLANKET, there is shown a horse blanket that drapes the horse from the base of the neck, about the rider and to the rear quarters. The blanket descends to just above the animal's knees. The device is clearly a blanket designed for body warmth but which fails to cover the head, neck and full rump of the animal, exposing these parts to pests that are prevalent in cool weather. Further, there are no articles attached to the blanket which would grant it a higher than normal visibility.

Similar to the design of '635, is that disclosed in U.S. Pat. No. 4,214,421 ('421) for a bi-part HORSE BLANKET AND HOOD APPARATUS. Intended as a "turn out" covering (i.e. the animal is to be turned out to pasture and not mounted), it extends the solitary partial covering of '635 to include a hood that covers the entire neck and jaw-crown portions of the head. The instant inventor finds the same limitations in this patent as in '635, including what can reasonably be deduced as significant weight and bulk.

Yet another horse blanket, disclosed in U.S. Pat. No. 6,003,290 ('290), drawn to a VENTILATED PROTECTIVE COVER FOR A HORSE, provides a single-piece covering for draping over the body from shoulder to rump. The blanket is heavy and possesses flap-covered, screened eyelets that allow ventilation through the otherwise waterproof, although "breathable" (vented), covering. A turn out garment, '290 suffers the same limitations as '635. Within this particular genre, of coverings, are two quite early U.S. Patents, number 373,764 issued for a HORSE BLANKET ATTACHMENT and number 791,372, drawn to HORSE-BLANKET. Both of these possess the same advantages and limitations as those horse blankets previously discussed. A more recent innovation to the familiar horse blanket is realized in U.S. Pat. No. 6,009,693, entitled: BREATHABLE, WATERPROOF HORSE BLANKET. Here the patentee provides a basic single-piece blanket of otherwise impermeable material, but with a mesh fabric therein that extends over a major portion of the back covering. A piece of the impermeable material is fixed in a "stand-off" (displaced from) position over the mesh fabric, by attachment to the blanket (proper) at several discrete points. This construction effects a conventional waterproof blanket that assures ventilation as the animal moves about. This article varies little from previously discussed turn out blankets, but it makes use of the flap-covered ventilation ports of '290.

Perhaps the most germane article found, relative to the instant invention, is seen in U.S. Pat. No. 6,128,891 ('891), entitled: PROTECTIVE HORSE MASK. Although confined to but a portion of a horse's head, this device, by use of a lightweight mesh fabric and fleece, provides face, ear and nostril protection against both sun and noisome insects. Although the device is perceived to be well suited to its task, the patent falls short of suggesting that the stated protection be applied to the preponderance of the animal's body. The mask also lacks means for rendering the animal highly visible.

That other working animals, such as dogs, may also be provided with protective garments, is well known in the art; U.S. Pat. No. 5,996,537, for an ALL PURPOSE CANINE PROTECTIVE COAT, and U.S. Pat. No. 6,089,194, for a REVERSIBLE HEAT-REFLECTIVE PET GARMENT, are illustrative of such knowledge. Both patents depict protective devices against weather, for any dog, irrespective of whether the animal is working. Likewise, animals wearing these dog garments would be quite visible before an active light source, but it remains problematical whether such visibility would persist in low ambient light, such as at dusk, in dense wood or during inclement weather.

Although coverings for animals are quite plentiful, the instant inventor has not been apprised of a garment for working animals, particularly horses under saddling gear, that possesses lightweight, extensive covering, which affords to the animal ventilation, fly protection and high visibility during low-light conditions.

INCORPORATION BY REFERENCE

The U.S. Pat. No. 6,128,891, issued to McMahon on Oct. 10, 2000 for a PROTECTIVE HORSE MASK is incorporated by reference for its showing of a partial head covering for a horse, said covering consisting in the combination of lightweight, fine mesh and fleece fabrics

DEFINITIONS

Most terms used herein are to be taken as having their customary English meaning. When different or secondary meanings may be applied, the inventor has, with their first usage, employed quotation marks and given their intended definition in parentheses. A few terms, however, are to be read with the following meanings (esp. in the claims):

breathable—having capability of ventilation or being evapotranspirative;

ensemble—an assemblage of parts (as in a set of clothing);

evapotranspirative—having the properties of liquid absorption and evaporation;

fluorescence—luminescence that may persist after removal of excitation;

iridescence—brilliance or high reflectance of light;

luminescence—emission of visible light after non-thermal energy stimulation; and saddling gear—the saddle, including cinching and accouterments for attachments.

BRIEF SUMMARY OF THE INVENTION

The instant inventor has overcome deficiencies of the early art by providing an ensemble of illuminative, well ventilated, insect-resistive garments for working animals, such as horses under saddling gear or field dogs. Dual safety objectives are satisfied by this invention: first, prevention of animal harassment by biting insects such as deer/black/horse flies, which could cause a horse to stumble or a dog to turn into line of fire; and second, identification of the animal (and rider or master) during conditions of low ambient light. Hereinafter, the descriptions of the invention and its maximum benefits will be described, principally, in respect of the horse, donned with saddling gear (or under saddle).

The first of these objectives is attained, in varying degree, by cloaking portions of the animal in a single garment or a plurality of garments, the latter ensemble being preferred. Garments of the ensemble are constructed of lightweight, breathable mesh fabrics of the type that are used for their ventilation or moisture-wicking properties. Moreover, the fabric used by the inventor is produced, and available off the shelf, in iridescent colors. Under fair weather and light (normal) ambient conditions, the ensemble provides: a hood (head covering); a hood-connected cape (neck covering), which descends to the withers and is attached to the saddling gear; and a body drape, consisting in a single garment attached, to saddling gear, so as to cover the horse's flanks, back and rump laterally and rearward of the saddling gear. The garment fabric is of a mesh small enough to frustrate the common biting flies, yet large enough to "breath"—in the preferred embodiment, having foramen size from about 0.5 mm to about 1.5 mm. The bonnet portion (head cover) of the ensemble stands off the eyes of the animal, thereby providing to them an insect-and light debris-resistive guard or barrier protection. Under such (normal) conditions, both safety objectives of the invention are met when the iridescent fabric is used.

To achieve the second objective, under less than optimum visibility conditions, there is provided, on discrete sites of the garments, a series of illuminative strips or patches. Several fabrics of luminescent, fluorescent or otherwise highly reflective character are readily available, on the market. These indicators, or illuminative indicia, are affixed by sewing/stitching, snap fasteners or, like the preferred method of connecting the above garments, by use of materials bearing hooks and loops, as in the product Velcro®.

DETAILED DESCRIPTION OF THE INVENTION

This disclosure is made in great detail, predicating elements superfluous to the primary objective—that of affording protection from biting insects. In its most basic mode, only the ensemble, in breathable or evapotranspirative, mesh material need be considered, in order to provide that protection. Further, in a de minimus application, only head and neck of the animal are protected, they being the most sensitive areas.

Figure 1:
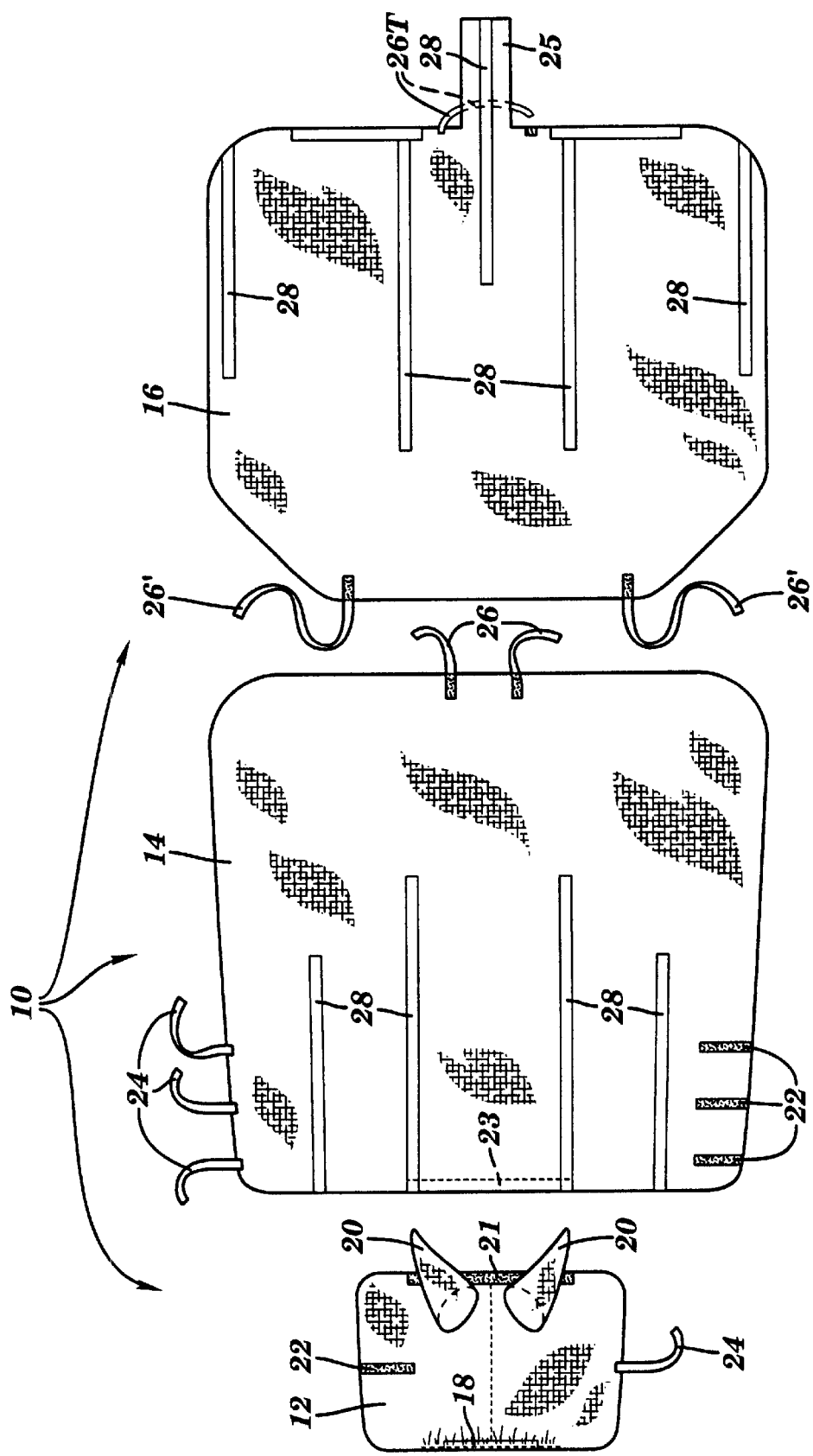
FIG. 1 is a plan view of the three garments of the invention.

Reference being had to FIG. 1 of the Drawings, the invention 10 is laid out schematically, in the horse/equine ensemble. Irrespective of actual sizing, which varies with breed and size, the ensemble consists, nominally, in two or three garments, the latter being shown. To achieve maximum visibility, under normal daylight conditions, the garments are colored in an iridescent color such as international orange, an identification/safety color which is known among sportsmen as "blaze orange"; however, other high visibility, iridescent or fluorescent colors are also used. The reader is apprised that, depending on the particular animal and desired degree of garment "customization" (special sizing/fitting), two or all of the garments may be rendered as one. For the sake of brevity and clarity in disclosure, only the invention's two-part (head and neck coverings only) and tri-part garment for equine and canine animals will be addressed.

Continuing in FIG. 1, the invention 10 is displayed, serially, as the headpiece, or bonnet 12, the neck cape 14, and the laterals and rear cover 16 (hereinafter, "rear cover"). Referring to the bonnet 12 structure, there are provided a hem gather 18, a pair of projecting, conical ear covers 20 and attachment strips 22 and straps 24 that include opposable hook and loop material (hereinafter, Velcro®). There is an additional Velcro® mechanism 21 for attaching the bonnet to the cape (here only, uniquely numbered).

The cape 14 is provided in size ample enough to allow the horse to lower its head for grazing. It is readily apparent that a different shape, as well as size, would be made for a non-grazing animal such as the canine (see FIG. 6). The rear cover 16 is likewise sized for the particular working animal and has a tail extension 25, specifically for the equine model. Velcro® attachment mechanisms 23, the cape hem (underside) that mates to the bonnet strip 21, cape securing strips 22 and straps 24, as well as under-the tail tie 26T are shown; their actual utilization will be highlighted in figures that follow. Final to FIG. 1, there are shown: ties 26, 26' and 26T, which possess both Velcro® hooks and loops; and, a plurality of illuminative indicia 28 that are strategically placed on the garments so that, under visibility conditions less than optimum, the animal's presence can be detected when the indicia are excited by an energy source. Many illuminative materials are available on the market and offered in variously shaped, adhesive or sew-on modalities. The inventor uses a tape product sold as Scotchlite®, an aluminized, highly reflective fabric. It should be realized also that the straps/ties may be made of an elastic material.

Figure 2:
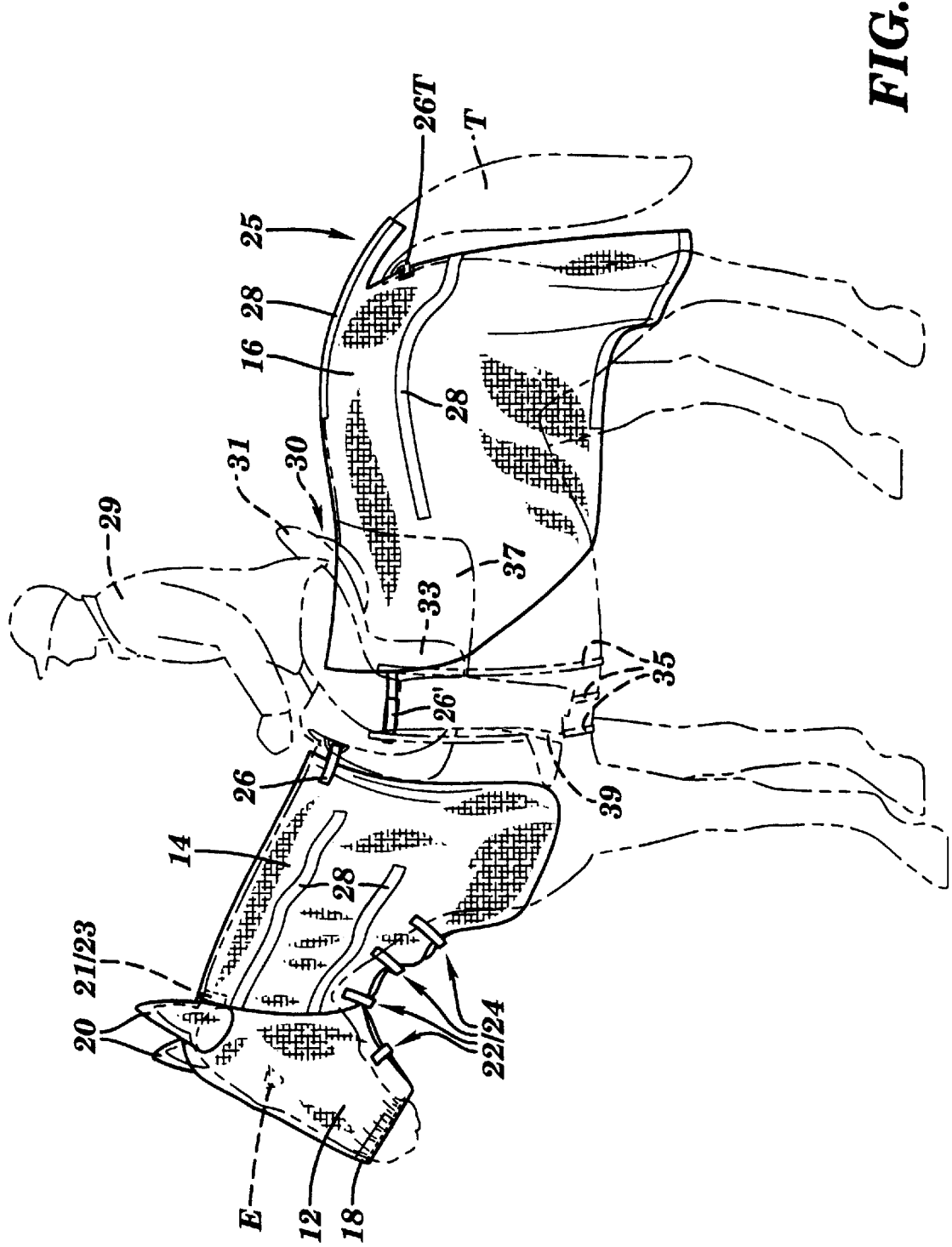
FIG. 2 is a side elevation sketch of a horse donned with the invention.

FIG. 2 depicts a horse 27, rider 29 and the saddling gear 30, all shown in phantom. The saddling gear includes: saddle 31, lateral, descending flaps(s) 33; cinch strap 35; saddle blanket 37 and, stirrup(s) 39. The cape 14 and rear cover 16 attach to saddling gear parts, except the blanket and stirrups. The bonnet 12 is donned first by passing the ears into the cones 20 and securing the straps 24 to strips 22, under the horse's throat. Note that this shaping from ears, over the head, allows the bonnet fabric to "stand off" the eyes E, thus not requiring the more elaborate mechanisms of earlier art and comprising an improvement to eye protection techniques. The mesh fabric, being multi-foraminous and in close proximity to the eye, does not hinder the animal's vision. The cape 14 is then draped over the neck, secured by Velcro® mating strips 23 to 21 to the bonnet and margin-secured underneath by connecting corresponding strips and straps 22/24, as shown. Lastly, the cape is secured to the saddle 31 by ties 26; this connection will be detailed in FIGS. 2 and 3. The rear cover 16 is draped over the rump and flanks of the horse, under a portion of the saddle 31, tethered by ties 26' to the saddle flaps 33, or cinch 35, and interconnected, under the tail T, by Velcro® tie and anchor 26T. Final to this figure is the depiction of the illuminative indicia 28 on both cape and rear cover.

Figure 3:
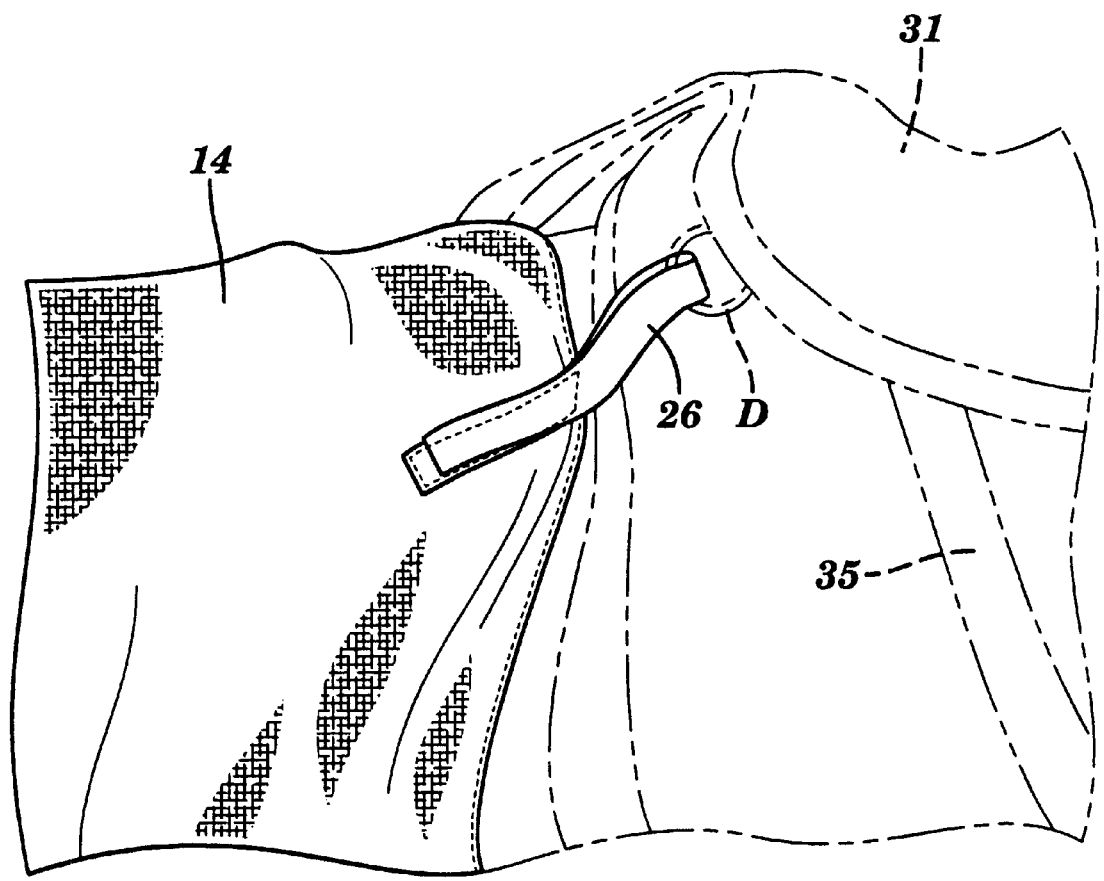
FIG. 3 is a detail of the cape or neck covering attachment to English style saddling gear.
Figure 4:
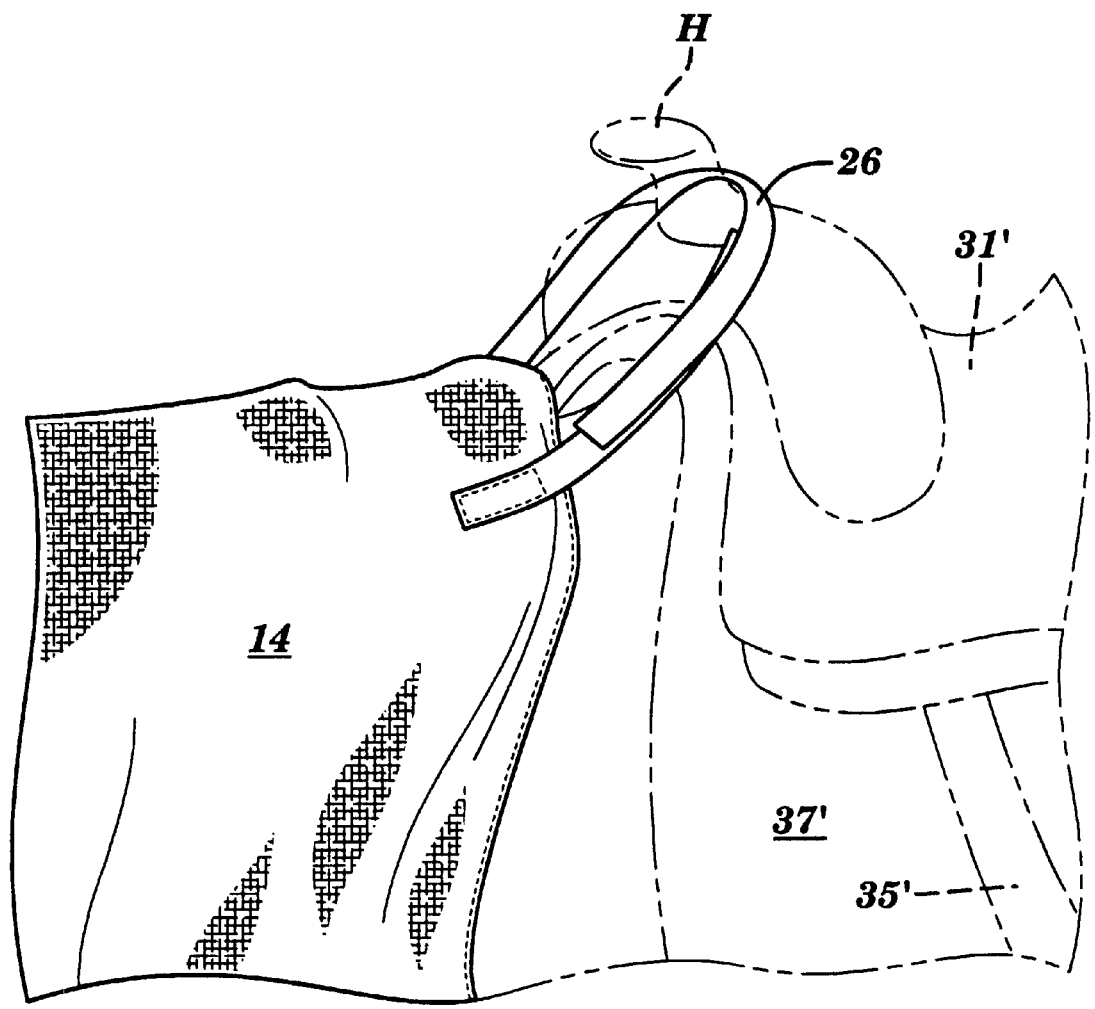
FIG. 4 is a detail of the cape or neck covering attachment to Western style saddling gear.

Turning now to FIGS. 3 and 4, front saddling gear and attachments are shown for English and Western articles, respectively. On the English gear of FIG. 3, the forward D-rings D are distinguished from the saddle horn H of the Western, FIG. 4. The remaining saddling gear, of both figures, is essentially the same except that, in this illustration only, identifying numbers of the Western gear are single-primed ('). The same Velcro® ties 26 are used by tethering each to the two D-rings in FIG. 3 or, alternately, connecting them to each other, and looping them over and around the horn H in FIG. 4.

Figure 5:
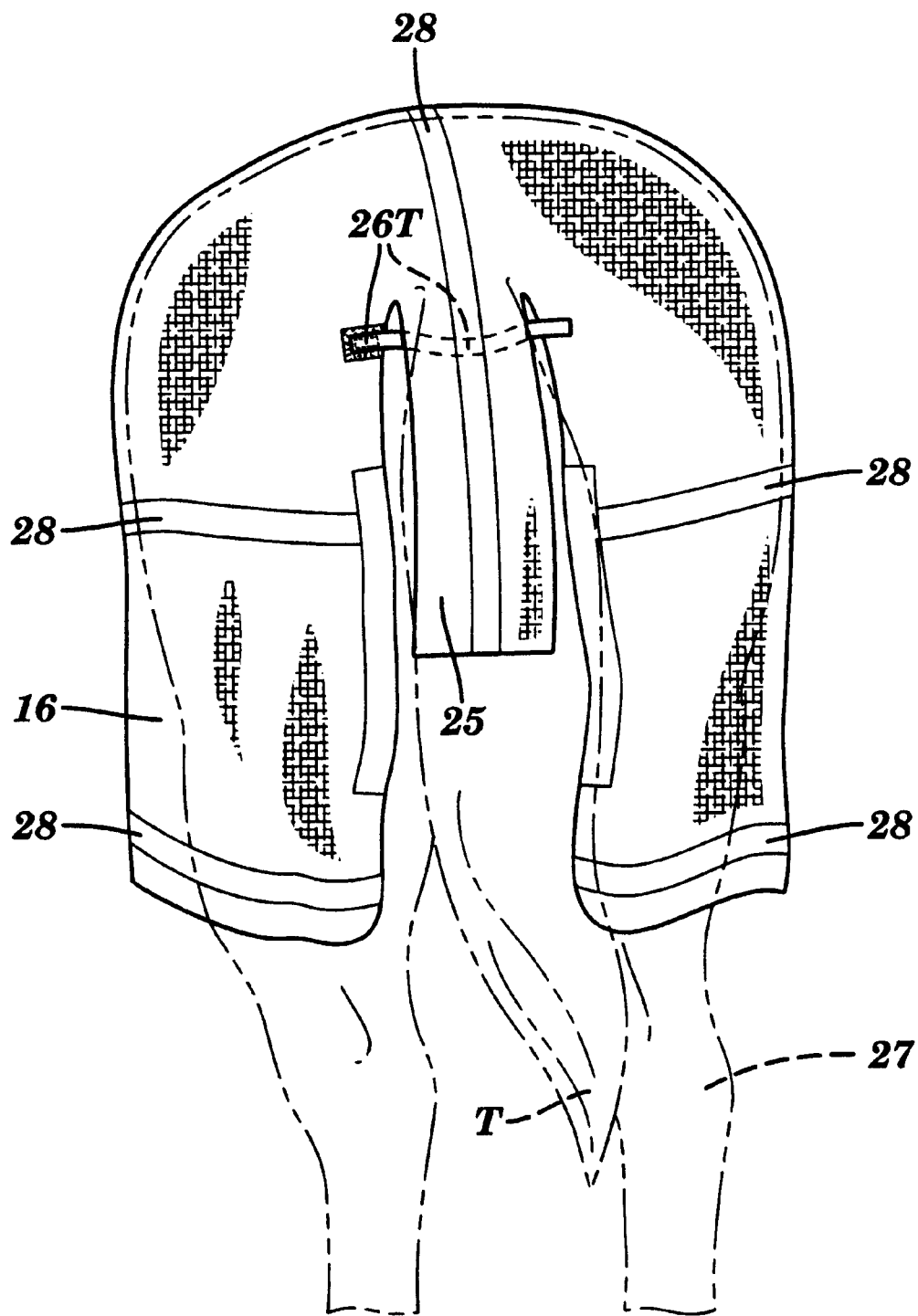
FIG. 5 is a partial rear elevation of a horse donned with the invention.

The rear cover 16, as shown in FIG. 5, gives the reader an idea of the drape of the cover over the full rear of the horse. The one element more clearly defined in FIG. 5 is the under-the-tail tie 26T. Along with FIG. 5, a reference to FIG. 1, and the (consistently numbered) elements therein, amply illustrates the degree of covering afforded the animal's upper body. Further, the ensemble may be said to lend itself to a high degree of customization, i.e., the rear cover and neck cape may be both lengthened and widened.

Figure 6:
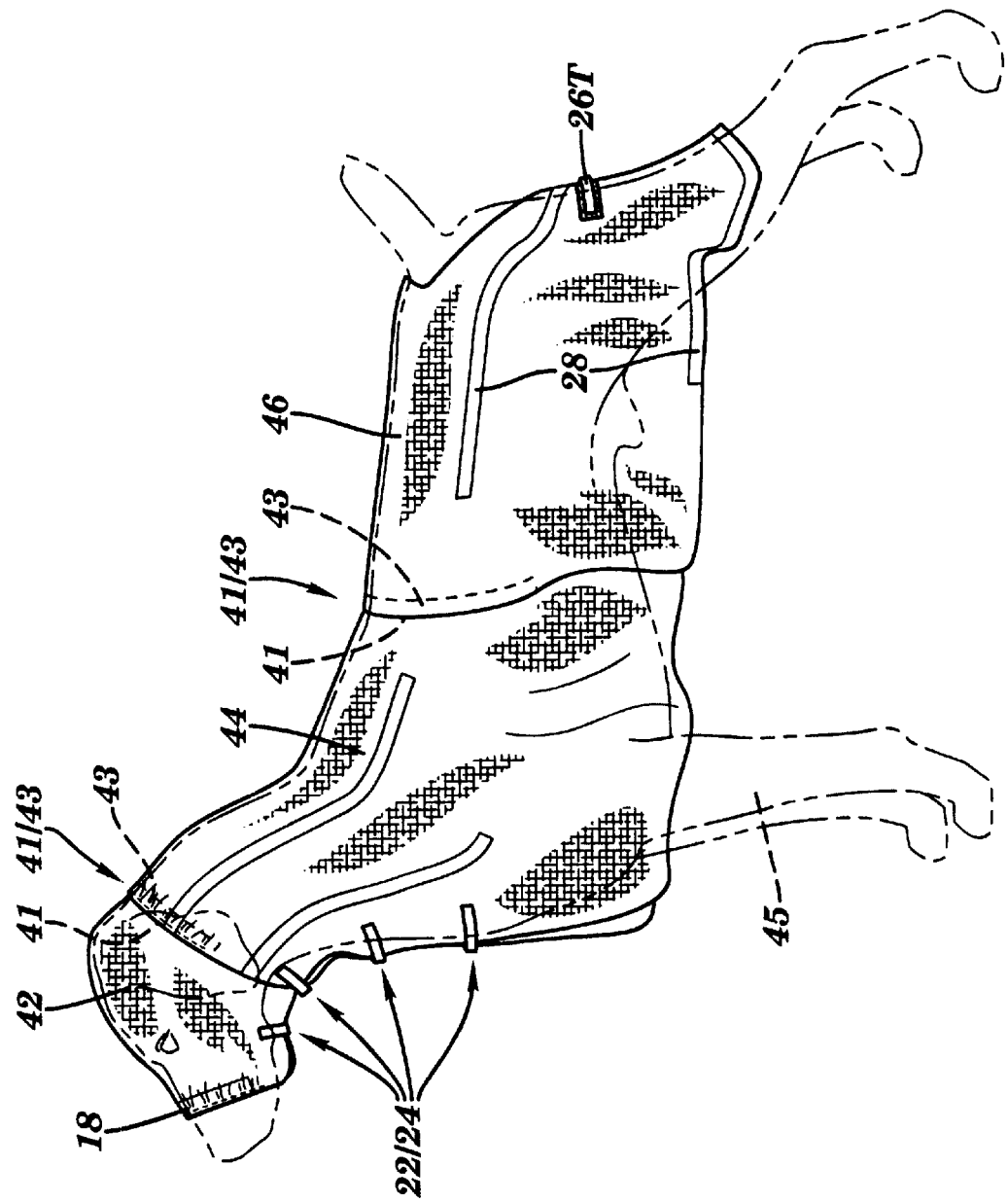
FIG. 6 is a side elevation sketch of a dog donned with the invention.

Final to the Drawings, FIG. 6 depicts the invention in an optional mode 40, fitted to a working dog 45, such as a German short haired pointer or similar short-haired canine. The necessity dictated by the varied morphology of this species is one of rather high customization. Nonetheless, the basic fly protection elements: bonnet or hood 42; neck-front quarter cape 44; rear cover 46; Velcro® connections 41/43 (same mechanisms as 21/23 of FIGS. 1 and 2) and ties 22/24, as well as under-the-tail Velcro® (pair) connector 26T, provide the needed degree of utility. Optional high visibility indicia 28 are also entertained, as well as the use of brightly colored mesh fabric and elastic ties, for the various garments.

As in the case for the horse, the plurality of garments for the dog, or any working animal, may be rendered as a unit or, depending on the actual pest conditions, in a structure to cover fewer portions of the animal's body, such as head or head-neck, only.

Such variations may be made readily by those practiced in the field, to which the invention is commended, consistent with the hereinafter appended claims.

What is claimed is:

1. A garment ensemble for a working animal comprising:
a plurality of lightweight, insect-resistive sections made of a breathable, high visibility mesh fabric, a first of the sections disposable over a preponderance of the animal's head, a second of the sections in communication with said first of the sections and disposable over the animal's neck and an optional third of the sections disposable over a preponderance of the animal's flanks and rear; and
an optional illuminative indicator disposed on at least one of the sections, for use during low visibility conditions.

2. The ensemble of claim 1 wherein the first and the second sections of said plurality form a unitary piece.

3. The ensemble of claim 1 wherein the first of the sections is detachably connected to the second and the second is detachably connected to the third.

4. The ensemble of claim 1 wherein the animal is a horse, with saddling gear cinched thereto, and wherein the first of the sections communicates with the second of the sections which is detachably connectable to the saddling gear.

5. The ensemble claim 4 wherein the third of the sections is detachably connectable to the saddling gear.

6. The ensemble of claim 1 wherein said at least one illuminative indicator is comprised of a material that radiates/reflects visible light when activated by an energy source and the mesh fabric is brightly colored.

7. A plurality of insect-resistive garments comprised of a lightweight, moisture-wicking/breathable, brightly visible mesh fabric for protection of a working animal, a first of the plurality of garments disposable over a preponderance of the animal's head, a second of the plurality being communicative with said first of the plurality and disposable over the animal's neck and a third of the plurality disposable over a preponderance of the animal's flanks and rear; and
at least one energy-excitable, illuminative indicator disposed on at least one of the garments.

8. The plurality of claim 7 wherein at least two of said garments form an integral unit.

9. The plurality of claim 7 wherein the working animal is a horse, with saddling gear, and wherein the first of the garments communicates with the second garment which is detachably connectable to the saddling gear.

10. The plurality of claim 9 wherein the third of the garments is detachably connectable to the saddling gear.

11. In a set of working animal garments, safety improvements comprising a plurality of lightweight, insect-resistive coverings comprised of a breathable, mesh fabric forming at least a first and a second of the plurality, wherein the first of the plurality is disposable over a preponderance of the animal's head, and a second of the plurality is communicative with said first of the plurality and is disposable over the animal's neck.

12. The set of claim 11 wherein said first and said second of said plurality of garments are a unit.

13. The set of claim 11 wherein the animal is a horse, with saddling gear cinched thereto, and wherein the first of the plurality communicates with the second of the plurality which is detachably connectable to the saddling gear.

14. The set of claim 11 further comprising a third of said plurality and wherein the third of the plurality is detachably connectable to saddling gear in an equine application and is communicative directly with the second of the plurality in a canine application.

15. The set of claim 11 further comprising high visibility materials that possess an illuminative property selected from the class of properties consisting of reflectance, fluorescence, iridescence and luminance.

16. A set of protective garments comprising a plurality of lightweight, insect-resistive coverings comprised of a breathable fabric for fitting to a working animal in order to cover at least a preponderance of the animal's head and neck.

17. The set of claim 16 further comprising a garment of said plurality for covering a preponderance of flank and rear areas of said animal.

18. The set of claim 16 further comprising at least one part thereof that possesses an illuminative property selected from the class of properties consisting of reflectance, fluorescence, iridescence and luminance.

19. The set of claim 16 wherein the fabric exhibits high visibility brilliance.

\* \* \* \* \*